(12) United States Patent
Steadman

(10) Patent No.: US 7,500,681 B2
(45) Date of Patent: Mar. 10, 2009

(54) COLLAPSIBLE CARRYING TROLLEY

(76) Inventor: William Steadman, 7858 Meadow Lark La., Port Saint Lucie, FL (US) 34952

( * ) Notice: Subject to any disclaimer, the term of this patent is extended or adjusted under 35 U.S.C. 154(b) by 483 days.

(21) Appl. No.: 11/219,285

(22) Filed: Sep. 2, 2005

(65) Prior Publication Data
US 2007/0052188 A1 Mar. 8, 2007

(51) Int. Cl.
*B62B 1/26* (2006.01)
(52) U.S. Cl. .............. 280/47.131; 280/47.19; 280/47.26
(58) Field of Classification Search ........... 280/47.131, 280/47.17, 47.18, 47.19, 47.26
See application file for complete search history.

(56) References Cited

U.S. PATENT DOCUMENTS

| | | | |
|---|---|---|---|
| 2,901,262 A * | 8/1959 | Berlin | 280/641 |
| 3,804,432 A * | 4/1974 | Lehrman | 280/654 |
| 4,047,724 A * | 9/1977 | Shaffer | 280/5.22 |
| 4,865,346 A * | 9/1989 | Carlile | 280/654 |
| 5,464,104 A * | 11/1995 | McArthur | 211/133.3 |
| 5,845,915 A * | 12/1998 | Wilson | 280/47.19 |
| 6,053,515 A | 4/2000 | Kelly | |
| 6,386,560 B2 | 5/2002 | Calender | |
| 6,485,037 B1 | 11/2002 | Sulcer, Jr. | |
| 6,561,745 B2 | 5/2003 | Rountree | |
| 6,866,289 B2 * | 3/2005 | Prather | 280/651 |
| 6,880,851 B1 | 4/2005 | Summers et al. | |

* cited by examiner

Primary Examiner—Christopher P Ellis
Assistant Examiner—Bridget Avery
(74) Attorney, Agent, or Firm—Tarolli, Sundheim, Covell & Tummino LLP

(57) ABSTRACT

A hand trolley for transporting materials in tubs or bins having frame with an upper and lower sections that are rotatably connected about a lower base section. The trolley includes a number of bracket lugs that are removably connected to the frame for attaching tubs or bins of various shapes and sizes. Attached to the trolley for moving the cart is a pair of wheels connected by an axle through the lower base section. The trolley also includes a locking mechanism wherein, engagement of the locking mechanism holds the lower base section in a transport position transverse from the upper section and disengagement of the locking mechanism allows the lower base section to rotate from a position transverse from said upper section to a storage position that is substantially parallel to the upper section.

11 Claims, 4 Drawing Sheets

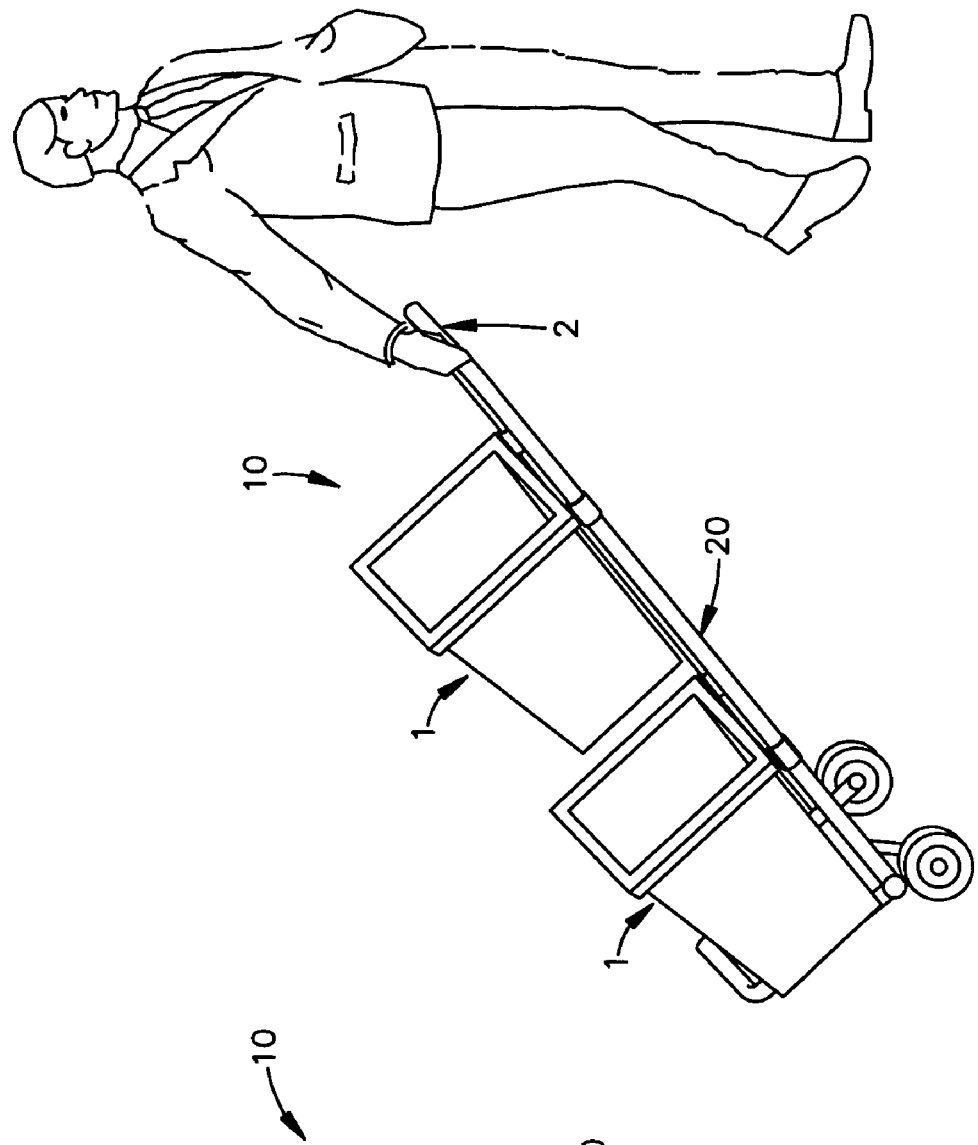
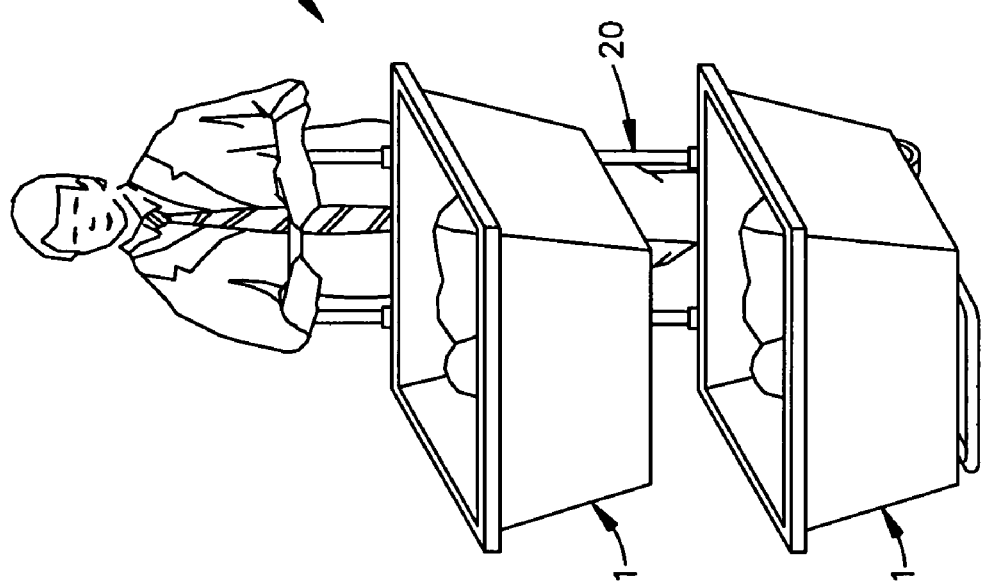
Fig.1
Fig.2

COLLAPSIBLE CARRYING TROLLEY

FIELD OF THE INVENTION

An apparatus and kit for holding and transporting materials, and more specifically, a collapsible carrying trolley that is capable of transporting multiple bins that can be easily inserted and removed from the trolley frame.

BACKGROUND ART

A carrying trolley is often referred to as a hand truck or dolly. Hand trucks and dollies have been commonly used to transport objects that are significant in size. For example, U.S. Pat. No. 6,485,037 issued to Sulcer discloses a hand truck for musical drums; U.S. Pat. No. 6,561,745 issued to Roundtree demonstrates a hand truck for transporting a floor sander; and U.S. Pat. No. 6,386,560 issued to Calender discloses a hand truck for large appliances.

Although less common, designs for carrying trolleys concentrated on transporting smaller objects have been the subject of issued patents. For example, U.S. Pat. No. 6,880,851 issued to Summers et al. discloses a hand cart for facilitating the movement of groceries to a desired location; U.S. Pat. No. 6,053,515 issued to Kelly describes a handy carrier that can be reconfigured into a dolly, wheel barrow, wagon and push cart.

Whether the object to be transported is large or small, the aforementioned patents do not describe a carrying trolley adapted for carrying multiple bins, light weight in construction, capable of flat, compact storage, or comprise a kit, making the trolley or hand truck easy to assemble. Several parts and tools are required to assemble each of the described hand trucks rendering them relatively complex for assembly. In addition, the configuration of each design discussed lacks flexibility in transporting multiple bins of varying sizes while allowing the trolley to collapse relatively flat for storage.

While the devices discussed above fulfill their respective, particular needs and objectives, there remains a need for a transport device that is compact for storage, easily assembled, flexible in design allowing transport of multiple bins that comprise a variety of shapes and sizes, and that is cost effective to manufacture.

SUMMARY

The present disclosure concerns a collapsible carrying trolley for transporting multiple bins of various sizes is disclosed. The trolley meets the needs of individuals requiring a device that allows an assortment of bins of varying sizes to be easily attached and removed for transport.

It is becoming increasingly popular for individuals to subscribe to environmental conservation programs that include, among other things, recycling. Many suburbs and municipalities throughout the United States and abroad are instituting recycling programs, not only for the environmental benefits, but also as a result of the monetary value associated with the products being recycled. As such, many cities and suburbs provide to their respective residents tubs and bins for trash and recycling. The tubs and bins are manufactured in an large number of shapes and sizes. Typically, the bins and tubs after being filled require transporting to a new location so that the municipalities can collect the materials in the most efficient manner. This often requires the residents to transport the trash or recycled materials to the end of the driveway or to a designated centralized collection area. The disclosed carrying trolley provides an apparatus that allows for the transport of varying size tubs and bins to a desired location.

Another feature of the carrying trolley allows for the transport of multiple tubs or bins in such a way that the bins or tubs can be easily inserted or removed from the carrying trolley.

A further aspect of the carrying trolley is to provide a locking device that engages a portion of the carrying trolley reassuring the operator that a base section is locked when in a horizontal or transport position. The lock mechanism is designed to allow the operator to conveniently disengage the lock when it becomes desirable to store the carrying trolley, whereby the base portion is unlocked and rotated from a horizontal position to a vertical position becoming substantially parallel with the upper portion of the trolley.

In still another feature of the trolley is to provide a carrying trolley that is capable of assembly without tools and is collapsible for convenient storage. Many of the purchasers of the carrying trolley are likely without the tools necessary to assemble hand trucks taught in the prior art because of the complex design. Another aspect of the carrying trolley is to provide a low cost kit comprising a minimal number of pieces and that is capable of being assembled without tools or extensive mechanical knowledge.

The advantages found in the carrying trolley make it conceivable that the applications for the carrying trolley should not be limited to transporting of trash or recycled goods. But instead, the carrying trolley's design is such that it may solve numerous transport application based on its flexible design, low cost to manufacture, compact storage design, and ease of assembly.

These and other aspects, features, and advantages of the carrying trolley will become better understood by reading the following detailed description of the preferred embodiments of the invention, which are described in connection with the accompanying drawings.

BRIEF DESCRIPTION OF THE DRAWINGS

FIG. 1 is a perspective view of a carrying trolley in upright position transporting carrying bins;

FIG. 2 is a perspective side view of the carrying trolley transporting carrying bins;

EXEMPLARY MODE FOR PRACTICING THE INVENTION

Figure 3:
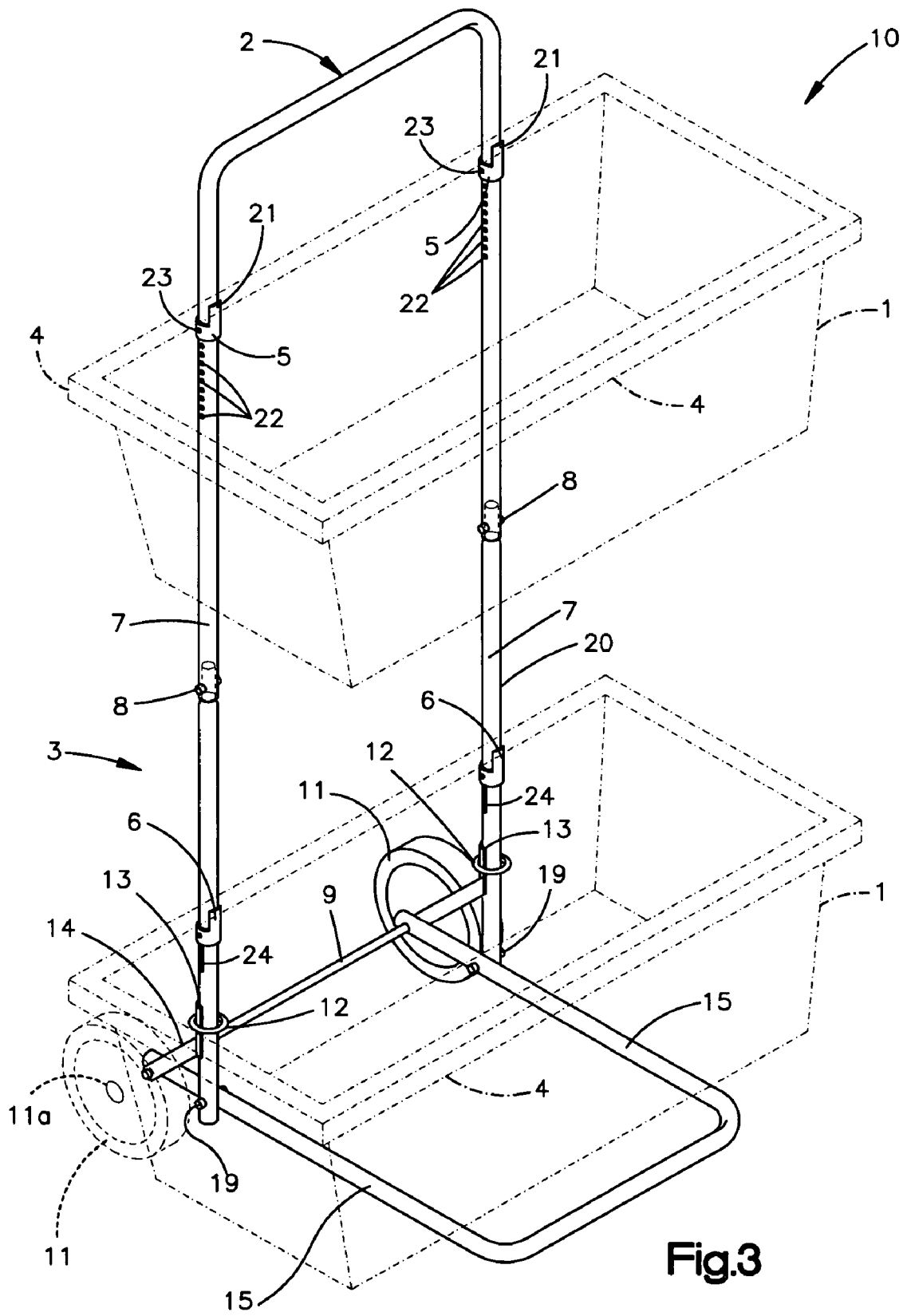
FIG. 3 is an isometric diagrammatic view of the carrying trolley with the carrying bins shown in phantom.

Turning now to the drawings, FIG. 1 is a perspective view of the carrying trolley assembly 10 in an upright or stationary position. FIG. 2 depicts the carrying trolley in a transport position where the operator is moving the trolley 20 via handle 2. Both FIGS. 1 and 2 show the bins or tubs 1 being transported by the trolley 20. Any number of materials can be transported within the tubs 1, in addition to recycled goods or trash. For example, the bins 1 are suitable for transporting compost or mulch for outdoor landscaping activities or projects that require the movement of articles to different locations that can be accommodated by various shaped tubs or bins capable of being transported on the trolley.

FIG. 3 is a diagrammatic view of the carrying trolley assembly 10, where the tubs 1 are shown in phantom. The trolley 20 acquires structural support from a frame 3 having an upper frame section 7 and a lower frame section 15. A pair of pivot pins 19 rotatably connects the upper and lower frame sections. The bins are supported on the upper frame section by a plurality of bracket lugs. In the exemplary embodiment, four separate bracket lugs are shown, a pair of upper lugs 5 and lower lugs 6 that include a projection or tongue 21. The bracket lugs are designed for easy removal or adjustment in order to accommodate varying sized bins and tubs. The adjustment and removal occurs through a series of holes 22 or slots 24 located along the upper frame 7. The adjustment of the lower lugs 6 also allows the lower bin to obtain support from the lower frame section 15, which is convenient for heavier articles needing transported. The bracket lugs comprise a pull pin 23 that facilitates the easy removal or relocation of the lugs about the upper frame 7.

The bracket lug projection 21 is designed to support the bin 1 from a lipped edge 4, which surrounds the bin's perimeter. The projection 21 is also designed to support straps or wire hangers for other types and shapes of bins.

During transport the trolley rolls on a pair of wheels 11. The wheels are interconnected through an axle 9 that passes through in the lower frame section 15. The lower frame section 15 may have bushings that allow the axle 9 to rotate, or alternatively, the wheels 11 may comprise bushing allowing rotation of the wheels about a relatively fixed axle.

Figure 4:
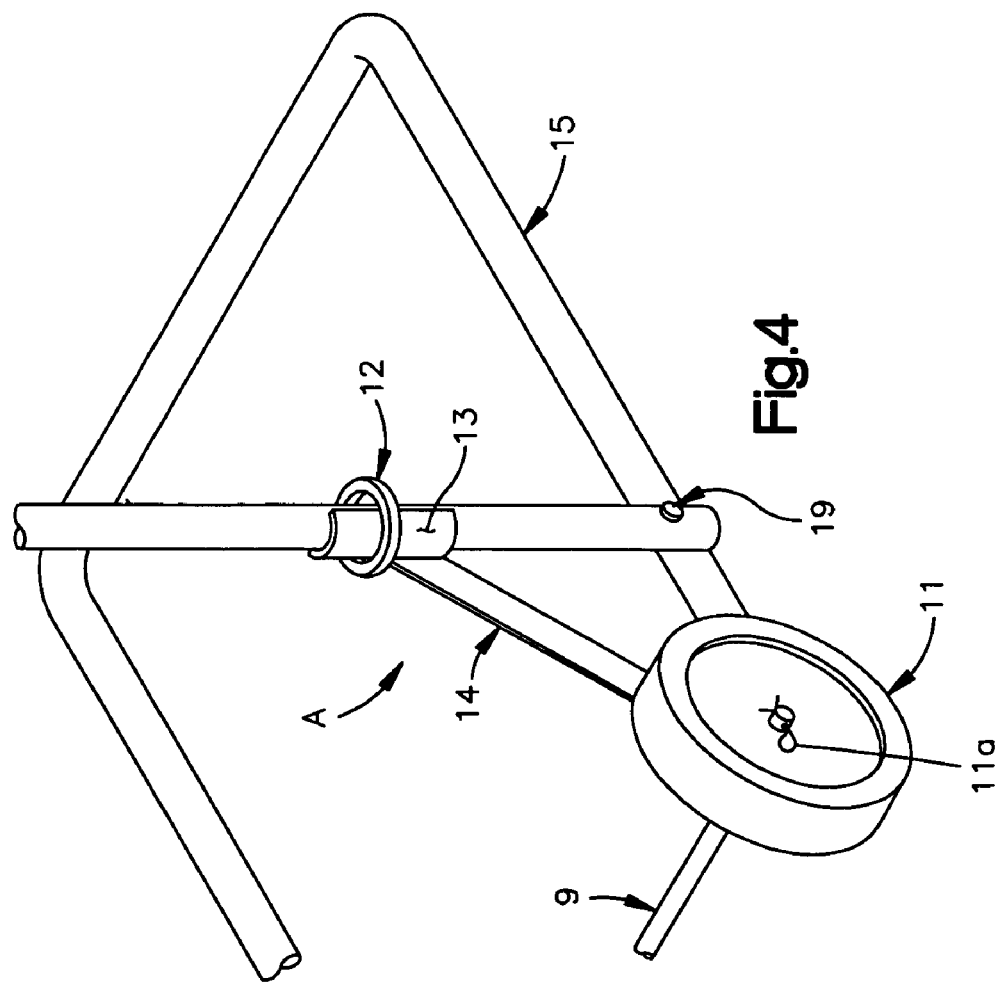
FIG. 4 is an isometric view of the carrying trolley's lower assembly.

In the transport position as shown in FIGS. 3 and 4, the lower and upper frame sections acquire additional structural support from a pair of bracing brackets 14. Each of the bracing brackets can be attached solely to the lower frame member 15, or as shown in the exemplary embodiment it can be attached to the lower frame while allowing passage of the axle 9.

Figure 5:
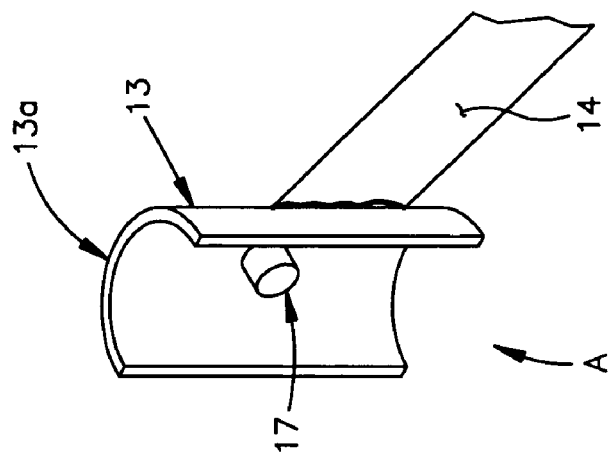
FIG. 5 is perspective view of the carrying trolley's locking assembly.

Another feature of the exemplary embodiment is a locking assembly A shown in FIGS. 4 and 5. The locking assembly includes the pair of bracing brackets 14 fixedly attached to lower frame member 15, which rotate relative to the upper frame member 7. Each bracing bracket 14 has an arcuate support 13, and a corresponding locking ring 12. Fixedly attached to the arcuate supports 13 are pins 17, as shown in FIG. 5 that communicate with a pair of holes 16 located within the upper frame member 7.

When the trolley 20 is in the transport position the lower member 15 is substantially transverse to the upper frame support 7, thereby allowing the bracing brackets 14 to contact the upper frame support 7 along the arcuate supports 13 with the pins 17 fitting into corresponding support holes 16. This allows the locking rings 12 to freely translate over the top portion of the arcuate support, as shown in FIG. 4, thus locking the trolley into a transport position. The locking assembly provides both structural support to the trolley assembly 10, and reassurance to the operator that the lower frame member 15 remains relatively stationary during transport while in the locked position.

Figure 6:
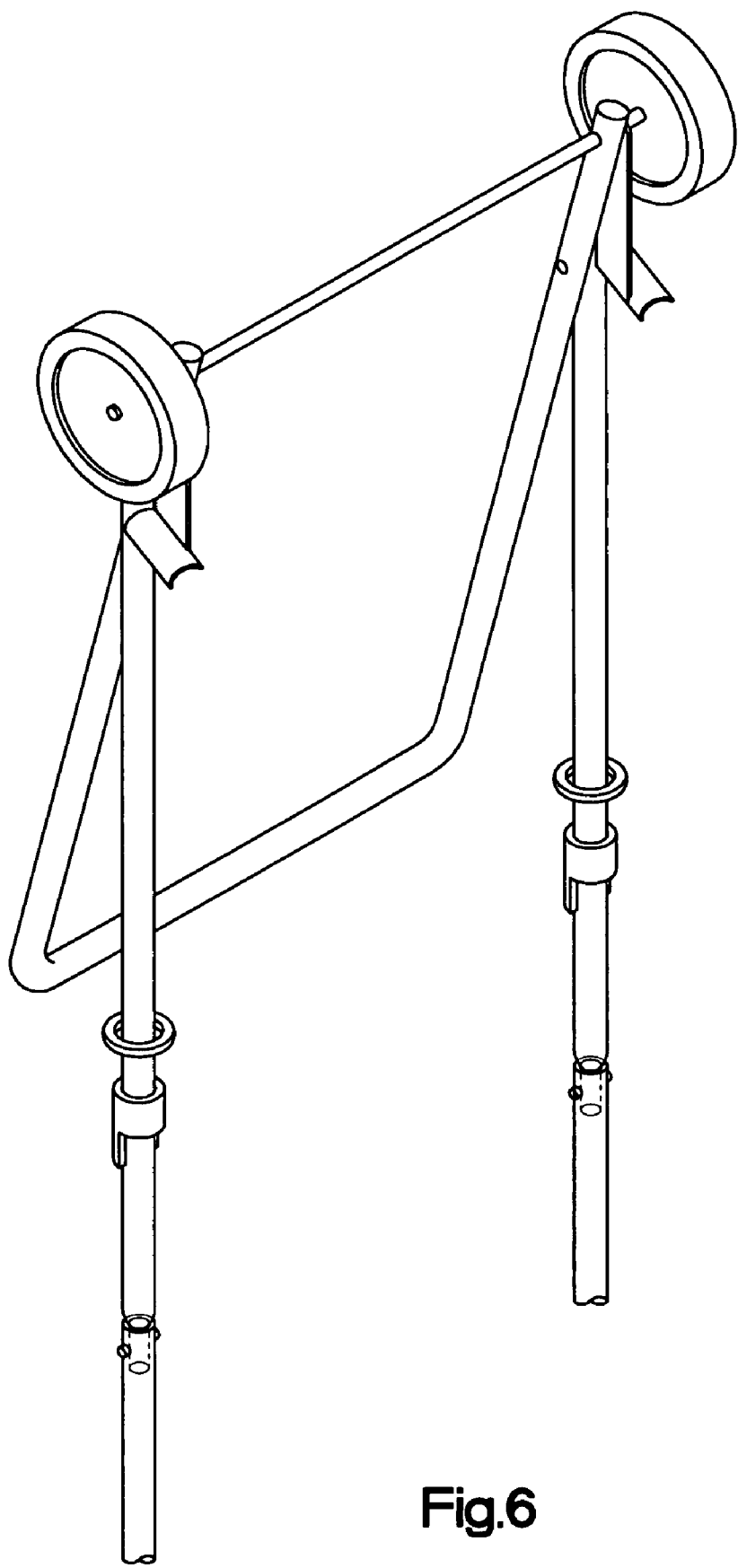
FIG. 6 is a perspective view of the carrying trolley in a closed or storage position.

The trolley 20 can be readily converted from the transport position of FIG. 3 to the storage position of FIG. 6 by lifting the locking rings 12 past an end 13a of the arcuate supports 13 then rotating the lower frame member about the pivot pin 19 to a position substantially parallel with the upper frame member 7. In the storage position the trolley is designed in such a way to allow it to be conveniently hung from a hook or placed underneath a bench because it is relatively compact when folded to this configuration, taking up a minimal amount of space. The trolley is capable of even further reduction in size during storage because of the quick-connect type pin 8 that allow the upper member 7 to telescope within its own frame.

Yet another feature of the exemplary embodiment is the trolley's ease of assembly. Pins 8, 19, and 23 are by way of example, a quick-connect type pin such as ring release pin sold by McMaster-Carr® part no. 92384A032 that are released by pulling a ring, or in other types of pins, engaging a button that releases a ball bearing normally biased out by a spring or wedge when in a non-release position. The bearing in the non-release position retains the pin within the frame member. Another type of pin capable for use in assembly is a pin having a hole for engagement by a cotter-pin. Such examples are types of pins that are considered satisfactory for the exemplary embodiment, which requires no tools for assembly.

Using the above described or similar type pins, the two piece upper frame 7 can be assembled by quick-connect type pins 8 by placing the pin between a pair of holes for receiving pins 8 when aligned by both sections. Similarly, the attachment of the lower 15 and upper frame members 8 can be attached by aligning the associated holes and inserting quick-connect pins 19. The upper 5 and lower 6 bracket lugs can be adjusted and removed for various sized containers efficiently by the described quick-connect pins 23 by engaging and disengaging the holes 22 or slots 24 located in an unlimited number of positions on the upper frame 7. The wheels 11 are also capable of quick attachment without the need of tools, possessing for example, a detent along the axle 9 that engages the wheels by snapping into place by applying pressure to the wheel when the axle is aligned with the hub. Or alternatively, the axle 9 could pass through the center of the wheels 11, and further comprise a hole at both ends 11a for attachment of a cotter-pin that retains the wheels onto the axle 9. Such assembly techniques in the exemplary embodiment allow for the ease in assembly without the use or need of tools. However, the exemplarily embodiment is capable of modification by those skilled in the art in such a way that could necessitate the need of tools should there require a more robust design for transporting heavier materials. For example, replacing the pins with heavier screws or bolts.

It is the intent that, although the invention has been described with a degree of particularity, the invention includes all modifications and alterations from the disclosed exemplary embodiment falling within the spirit or scope of the appended claims.

I claim:

1. A transport apparatus comprising:
   a) a frame having an upper section rotatably connected to a lower base section;
   b) a plurality of bracket lugs removably connected to said frame for supporting one or more containers;
   c) a set of wheels rotatably connected to said lower base section of said frame; and
   d) a locking mechanism comprising;
      i. at least one bracing bracket for structural enhancement to said frame, where said bracing bracket is fixedly attached to said lower base section of said frame;
      ii. a locking tab fixedly attached to said bracing bracket including a projection for communicating with a corresponding hole in said upper section of the frame, which supports said lower base section when configured in said transport position; and
      iii. an annular member that selectively engages the bracing bracket locking the upper frame section against the lower frame base section when arranged in said transport position;

e) wherein, engagement of said locking mechanism holds said lower base section in a transport position transverse to said upper section and disengagement of said locking mechanism allows said lower base section to rotate from a position transverse to said upper section to a storage position that is substantially parallel to said upper section.

2. The transport apparatus of claim 1, wherein said annular member is a ring.

3. The transport apparatus of claim 1, wherein said locking tab is arcuately shaped.

4. The transport apparatus of claim 1, wherein said projection is a pin.

5. A carrying trolley apparatus comprising:
   a) a frame having an upper Section rotatably connected about a lower section;
   b) a plurality of bracket lugs removably connected to said frame for attaching varying sized carrying bins to the frame;
   c) a set of wheels rotatably connected about said lower section of said frame;
   d) at least one bracing bracket fixedly attached to said lower section of said frame having a locking tab fixedly attached to said bracing bracket, said locking tab comprising a pin for engaging a hole on said upper section, which adds support to the lower frame section while in a transport position; and
   e) at least one locking ring slideably connected about said upper section for selectively engaging over an end portion of said locking tab;
   f) wherein, said locking ring slides over said locking tab after the lower frame section is rotated with respect to said upper frame section to a position transverse to the upper frame section, thereby locking the lower frame section into the transport position.

6. The transport apparatus of claim 5, wherein said locking tab is arcuate.

7. The transport apparatus of claim 5, wherein said bracket lugs are slideably connected to said frame through a series of adjustment slots.

8. A hand truck kit comprising:
   a) a tubular frame having an upper section and lower section;
   b) a plurality of adjustable bin hangers removably attachable to said upper and lower sections of said frame for attaching various shaped and size containers;
   c) a set of wheels rotatably connectable about said lower section of said frame;
   d) at least one support fixedly attachable to said lower section of said frame for structurally enhancing said frame when in a transport position;
   e) at least one arcuate locking tab attached to said support having a pin that is in communication with a corresponding hole in said frame; and
   f) one ring corresponding to each locking tab that is slideably connectable to said frame that selectively enables the lower frame section to rotate in and out of said transport position relative to said upper frame section.

9. The hand truck kit of claim 8, whereby rotating the lower frame section to a position transverse to said upper frame section and translating said ring to a position encompassing said arcuate locking tab, locks said hand truck into said transport position.

10. The hand truck kit of claim 8, whereby translating said ring to a position above said arcuate locking tab and rotating said lower frame section to a position substantially parallel to said upper frame section places said hand truck into a storage position.

11. The hand truck kit of claim 8, wherein said adjustable bin hangers are capable of adjustment through a plurality of holes located on said frame.

\* \* \* \* \*